(12) United States Patent
McHowell (10) Patent No.: US 8,028,434 B2
(45) Date of Patent: *Oct. 4, 2011

(54) MULTI-SPACER TOOL

(76) Inventor: James W. McHowell, Hyde Park, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,479

(22) Filed: Feb. 1, 2011

(65) Prior Publication Data

US 2011/0119944 A1   May 26, 2011

Related U.S. Application Data

(63) Continuation of application No. 12/198,502, filed on Aug. 26, 2008, now Pat. No. 7,913,413.

(51) Int. Cl.
   *G01D 21/00* (2006.01)
(52) U.S. Cl. .......................................... 33/613; 33/645
(58) Field of Classification Search ................ 33/613, 33/645, 562, 415, 418, 419, 422, 429, 452, 33/454, 456, 458–460, 464, 468, 474, 476, 33/478–481
   See application file for complete search history.

(56) References Cited

U.S. PATENT DOCUMENTS

| | | | | |
|---|---|---|---|---|
| 1,416,473 A | * | 5/1922 | Kirgan | ............... 33/419 |
| 1,524,392 A | | 1/1925 | East | |
| 2,775,037 A | | 12/1956 | Baumunk | |
| 2,911,022 A | * | 11/1959 | Brown | ............... 33/613 |
| 3,963,230 A | * | 6/1976 | Jankowski, Jr. | ............... 269/41 |
| 4,212,108 A | | 7/1980 | Jackson | |
| 4,499,666 A | | 2/1985 | Smith | |
| 4,625,415 A | * | 12/1986 | Diamontis | ............... 33/613 |
| 5,129,153 A | | 7/1992 | Burns, Sr. | |
| 5,163,233 A | * | 11/1992 | Benson | ............... 33/613 |
| 5,367,783 A | | 11/1994 | Nygren | |
| 5,396,710 A | | 3/1995 | Battaglia | |
| 5,446,969 A | | 9/1995 | Terenzoni | |
| 5,913,546 A | * | 6/1999 | Kuchenbrod et al. | ........... 33/645 |
| 6,293,028 B1 | | 9/2001 | Sylvia | |
| 6,381,908 B1 | * | 5/2002 | Fisher | ............... 33/562 |
| 6,418,695 B1 | | 7/2002 | Daudet et al. | |
| 6,543,144 B1 | | 4/2003 | Morin | |
| 6,701,689 B2 | | 3/2004 | diGirolamo | |

(Continued)

FOREIGN PATENT DOCUMENTS

WO   WO-2010/025089 A1   3/2010

OTHER PUBLICATIONS

"U.S. Appl. No. 12/198,502, Notice of Allowance mailed Jan. 20, 2011", , 7.

(Continued)

*Primary Examiner* — Yaritza Guadalupe
(74) *Attorney, Agent, or Firm* — Strategic Patents, P.C.

(57) ABSTRACT

A multi-purpose spacer provides working surfaces for properly spacing studs, joists, rafters, and decking. The spacer (also referred to herein as a "tool" or "jig") includes an adjustable spacer for balusters used in staircase railings, deck railings, and the like. The spacer may be constructed of a light metal, preferably aluminum, or suitably rugged plastic, and may also include a removable, padded handle to ease transport and use. Embodiments of the invention provide a spacing tool that is (for all practical purposes and in accordance with typical tolerances in the framing carpentry industry) completely temperature- and humidity-immune as well as waterproof.

17 Claims, 9 Drawing Sheets

U.S. PATENT DOCUMENTS

| | | |
|---|---|---|
| 6,796,049 B1 | 9/2004 | Claxton |
| 6,854,196 B2 | 2/2005 | Burrell et al. |
| 7,254,920 B2 | 8/2007 | Steele |
| D595,599 S * | 7/2009 | McHowell ............ D10/65 |
| 7,913,413 B2 | 3/2011 | McHowell |
| 2004/0003509 A1* | 1/2004 | Peterson ............ 33/645 |
| 2007/0215234 A1 | 9/2007 | Poole |
| 2008/0141617 A1* | 6/2008 | Joski ............ 33/527 |
| 2008/0178484 A1 | 7/2008 | Cother |
| 2010/0050454 A1* | 3/2010 | McHowell ............ 33/613 |

OTHER PUBLICATIONS

"U.S. Appl. No. 12/198,502, Non-Final Office Action mailed Nov. 13, 2009", , 3 Pgs.

"U.S. Appl. No. 12/198,502, Final Office Action mailed Jul. 13, 2010", , 19.

"International Application Serial No. PCT/US09/54594, Search Report and Written Opinion mailed Nov. 17, 2009", , 11 Pgs.

\* cited by examiner

MULTI-SPACER TOOL

RELATED APPLICATIONS

This application is a continuation of U.S. application Ser. No. 12/198,502, filed Aug. 26, 2008, the entire contents of which is incorporated herein by reference.

BACKGROUND

Carpenters on the job typically perform many tasks over and over, such as framing wall studs, floor joists, and roof joists (also known as rafters), installing decking, building balustrades and staircases, and installing trim. In order to save time, jigs or other fixtures or tools are used to make hold work pieces (e.g., studs or decking) in place with a regular, repeatable spacing relative to other pieces. While a number of jigs and the like are commercially available, existing jigs suffer from a number of shortcomings. First, because they are designed for a single repetitive task, they are usually not very versatile or able to do other tasks. Second, as the nature of the work typically calls for large spacers (e.g., 16 inches on center for studs, 18 or 24 inches on center for joists or rafters), the jigs themselves tend to be somewhat larger than a toolbox. When a carpenter needs three or four jigs, his transport and storage space can rapidly fill up.

What is needed is a single, multi-purpose spacer jig capable of providing the major carpenter's spacing functions, namely stud, joist/rafter, and decking installation spacing in a single, compact tool.

SUMMARY

A multi-purpose spacer provides working surfaces for properly spacing studs, joists, rafters, and decking. The spacer (also referred to herein as a "tool" or "jig") includes an adjustable spacer for balusters used in staircase railings, deck railings, and the like. The spacer may be constructed of a light metal, preferably aluminum, or suitably rugged plastic, and may also include a removable, padded handle to ease transport and use.

Embodiments of the invention provide a spacing tool that is (for all practical purposes and in accordance with typical tolerances in the framing carpentry industry) completely temperature- and humidity-immune as well as waterproof.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present apparatus are directed to a device for spacing and holding materials in place while they are being fastened or otherwise installed. The apparatus may be used with wood, metal, or composite framing and other building materials. The tool is intended for general carpentry, and may be configured especially for use in construction of decking, stairs, framing, and so forth. It will be understood that while the following description emphasizes English units for dimensions and construction standards common in the United States (e.g., inches, feet, pounds, etc.), the devices described herein may be suitably adapted to use in other geographic regions that apply partially or completely different units and standards, such as the metric system (e.g., meters, millimeters, grams, etc.).

Figure 1:
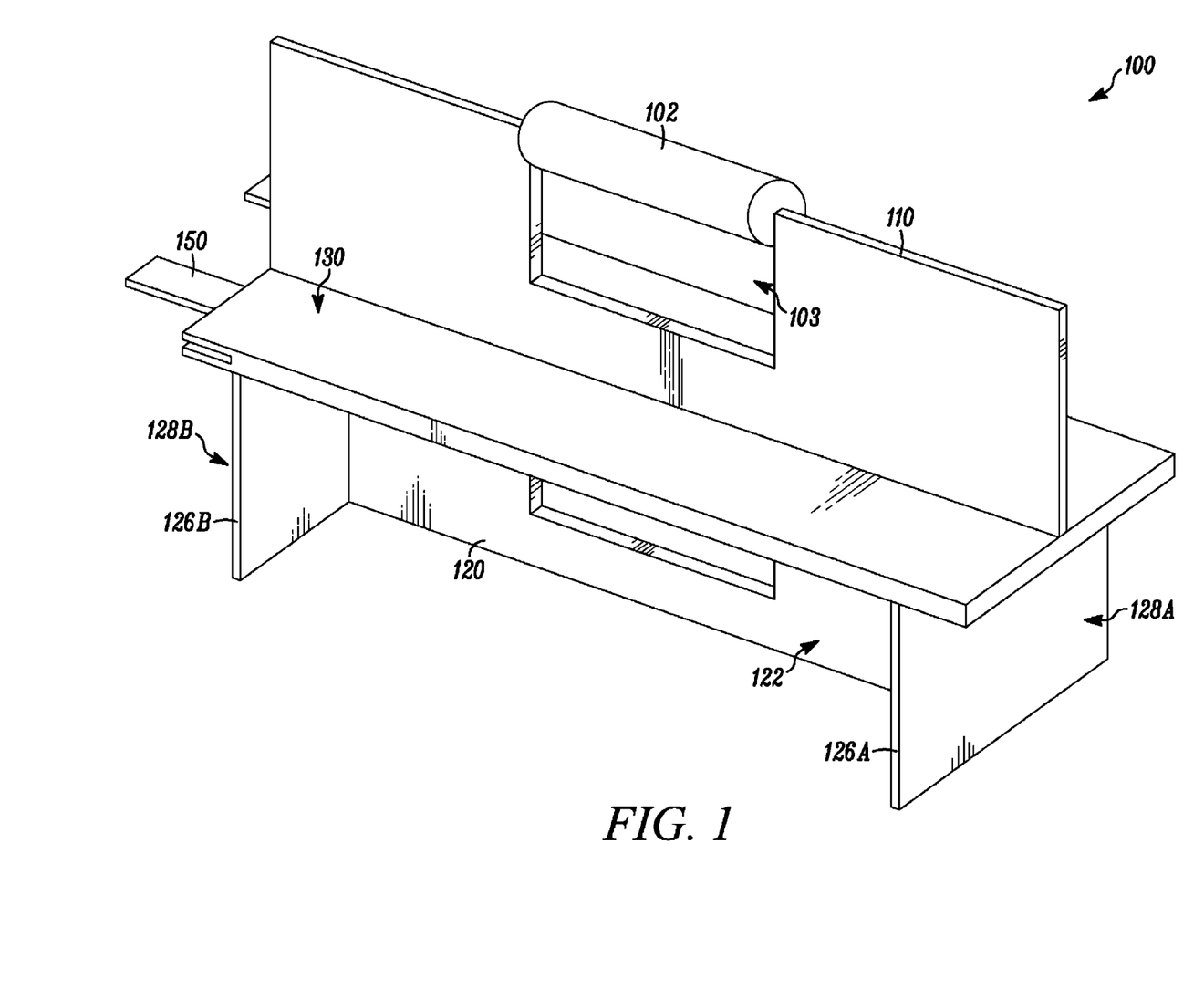
FIG. 1 is an isometric view of a multifunction spacer tool according to one embodiment of the present invention.

FIG. 1 shows an isometric view of an embodiment of tool 100 with a padded handle 102 attached at a handle cutout 103 to a floorboard spacer 110. On the opposite side of tool 100, shown in position for use, is a stud spacer 120, which consists of a center chord 122 and two end caps 126A and 126B. In an embodiment, the distance from the outer side 128A of one end cap 126A to the outer side 128B of the other end cap 126B is 14½ inches, the standard inside spacing between studs placed 16 inches on center using typical 1½ thick dimensional lumber (e.g., the nominal 2×4 or 2×6 commonly used in the construction trade).

The floorboard spacer 110 may include a pair of spacing surfaces formed by opposing sides of the single, planar part 110 that extends upward at a right angle from a center line of the center deck 130. This pair of spacing surfaces may be separated by a distance selected to space, for example, floorboards, decking or the like, or any other building components that might be consistently spaced a relatively small distance apart. This may be, for example, one sixteenth of an inch, one eighth of an inch, one quarter of an inch, one half of an inch, or any other thickness suitable for spacing floorboards and the like.

The end caps 126A and 126B (also described herein with reference to the spacing surfaces formed by opposing, exterior sides of the end caps) may serve multiple purposes. In general, the end caps 126 present a pair of opposing, substantially parallel and substantially planar surfaces that extend from a bottom side of the center deck 130 and at a right angle thereto. This pair of spacing surfaces may be separated by a distance selected to space studs or the like, or more generally at a desired distance for any spacing function. In the position shown, the end caps 126 may also allow the tool 100 to stand on its own, so that it may be used to lay out and assemble wall sections laid flat on the floor or ground. The flat surface prevents tool 100 from being twisted out of square to the stud material during lay-up, ensuring accurate spacing.

The center deck 130 may be a substantially planar piece of material(s) measuring 16 inches long by 4 inches wide. While numerous dimensions may be employed, a sixteen inch length also provides a convenient, physical reference for actual center-to-center distances studs, which may assist in marking centers or the like. In another exemplary embodiment, the center deck 130 may have any length greater than the spacing surfaces of the end caps 126 useful for spacing in a construction environment. More generally, the length of the center deck 130 and the distance between the spacing surfaces of the end caps 126 may be selected to equal any commonly repeated spacing distance useful in construction.

Baluster spacer fingers 150 may be provided, also referred to herein simply as "fingers" (one of two being shown in the figure) as an adjustable spacer. When provided, the fingers 150 may allow repeatable positioning of balusters with an adjustable inter-baluster spacing, discussed further below. In general, the adjustable spacer formed by the fingers 150 and related hardware may provide for continuous spacing, or discrete spacing at intervals such as one sixteenth of an inch, one eighth of an inch, one quarter of an inch, and so forth. In one embodiment, as described below, the spacer may include adjustable fingers supported by a mechanical locking system that secures the fingers at one sixteenth inch intervals. The adjustable spacer may, for example, provide for spacing at discrete or continuous intervals ranging from, e.g., three-quarters of an inch to four inches, or over any other suitable range. It will be understood that a variety of techniques are known in the art for moving and locking two or more surfaces, any of which may be adapted to use as an adjustable baluster spacer, or more generally an adjustable spacer, as described herein.

Figure 2:
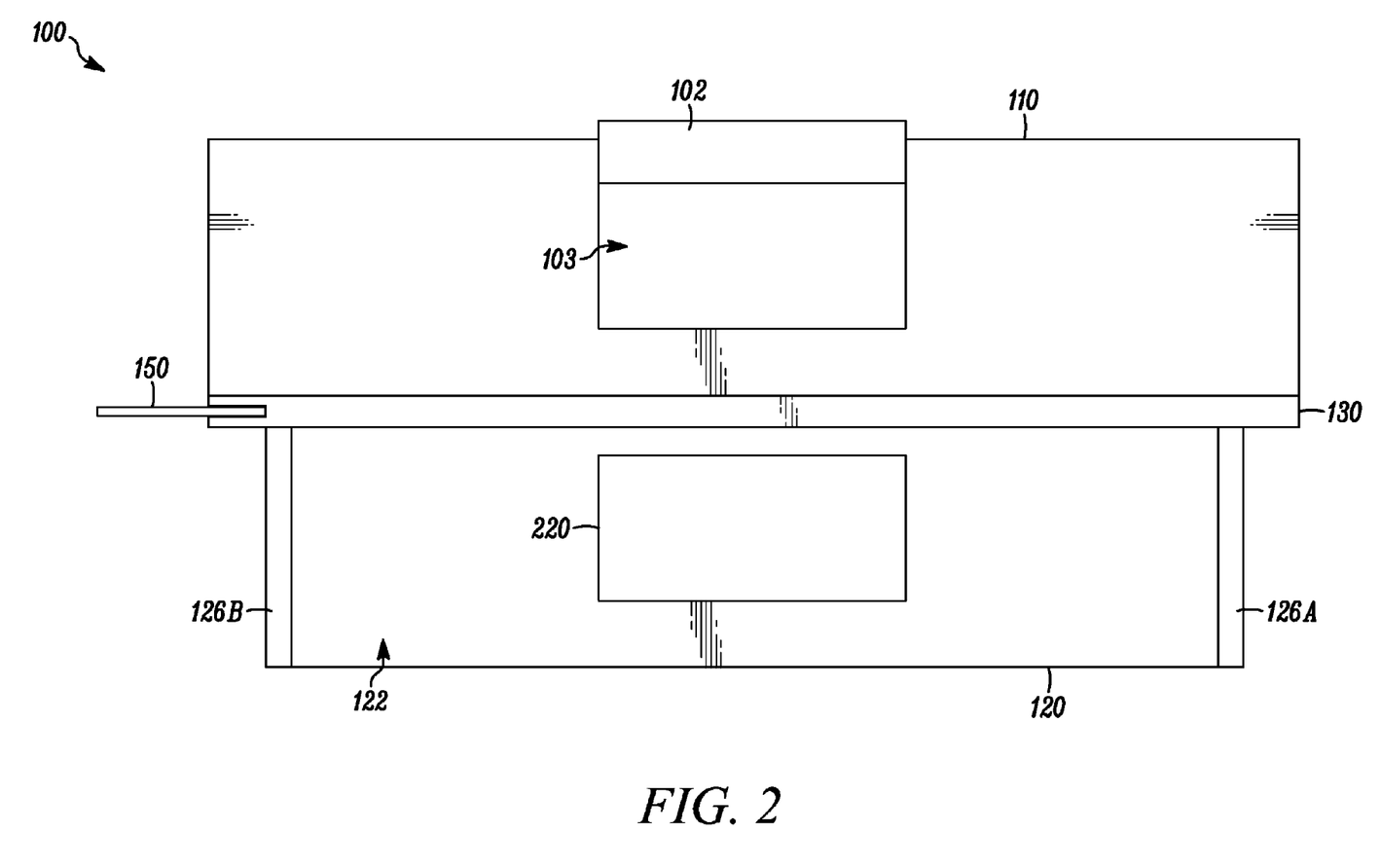
FIG. 2 is a front view of a multifunction spacer tool according to one embodiment of the present invention.

FIG. 2 is a front view of the tool 100, showing a padded handle 102 removably attached to the floorboard spacer 110. The handle 102 may be attached with small bolts, such as industry standard ¼ inch×1¼ inch hex-head machine screws or similar fasteners (not shown). The handle 102 may also, or instead, attach with a friction fit or other engagement to the tool 100. The handle 102 may be removable so that it may be attached to the stud spacer 120 at the cutout 220 and thereby allow the tool 100 to be inverted and used to space deck boards or other flooring material by inserting the floorboard spacer 110 between two pieces of floorboard, decking material, or the like. The thickness of the floorboard spacer 102 is selected so as to provide sufficient strength to tool 100 while not exceeding the typical floor or decking board-to-board spacing of 1/16 or 1/8 inch.

In one exemplary embodiment, the handle 102 is made of soft rubber, although it may be made of wood or metal. However constructed, the handle 102 may provide a cushioned gripping surface.

The floorboard spacer 110 may be attached to the center deck 130 through any of various means well known in the arts for attaching two plates, such as (but not limited to) welding, brazing, attachment via fasteners, or adhesives. Attached to the lower (in the view of FIG. 2) surface of the center deck 130 are the center chord 122 and the end caps 126A and 126B, together forming the stud spacer 120. The baluster spacer fingers 150 are shown in dashed line to illustrate that the depicted position (a "deployed" position), is movable, such as among various spacings, or between the deployed position and a stowed position in which the fingers 150 can be inserted into and contained within a perimeter of the center deck 130.

Figure 3:
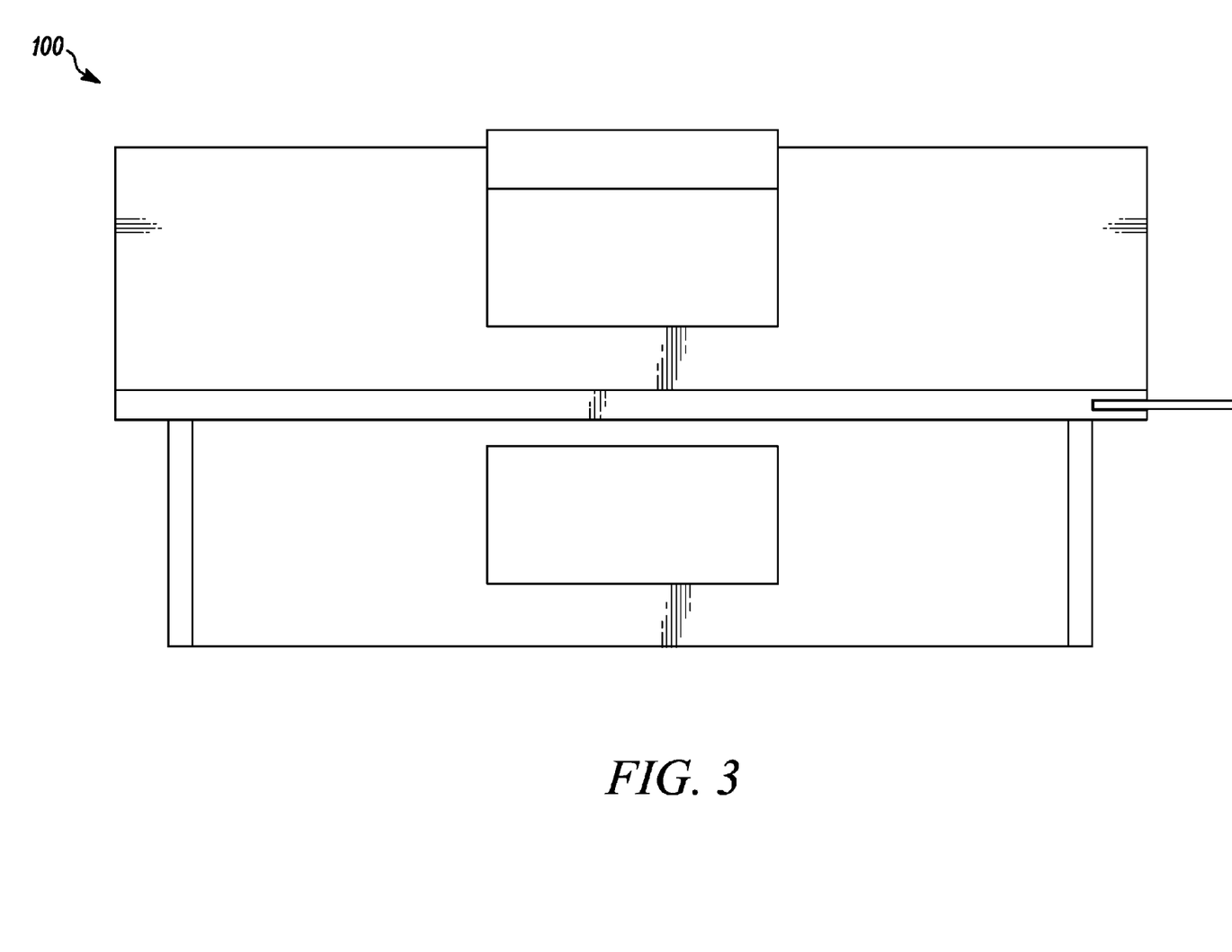
FIG. 3 is a back view of a multifunction spacer tool according to one embodiment of the present invention.

FIG. 3 is a reverse side view of the tool 100.

Figure 4:
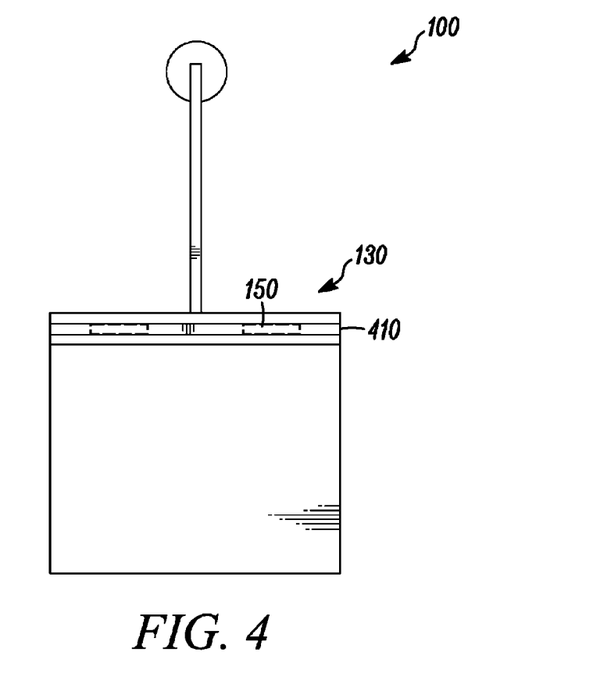
FIG. 4 is a right end view of a multifunction spacer tool according to one embodiment of the present invention.

FIG. 4 is an end view, looking into the baluster spacer fingers 150. In some embodiments, the center deck 130 includes a slot 410 or other opening in an end thereof in which the fingers 150 may be positioned at a user-set, variable spacing relative to each other. This feature is discussed in more detail below. In an alternate embodiment, no baluster spacer fingers 150 or center deck slot 410 is provided.

Figure 5:
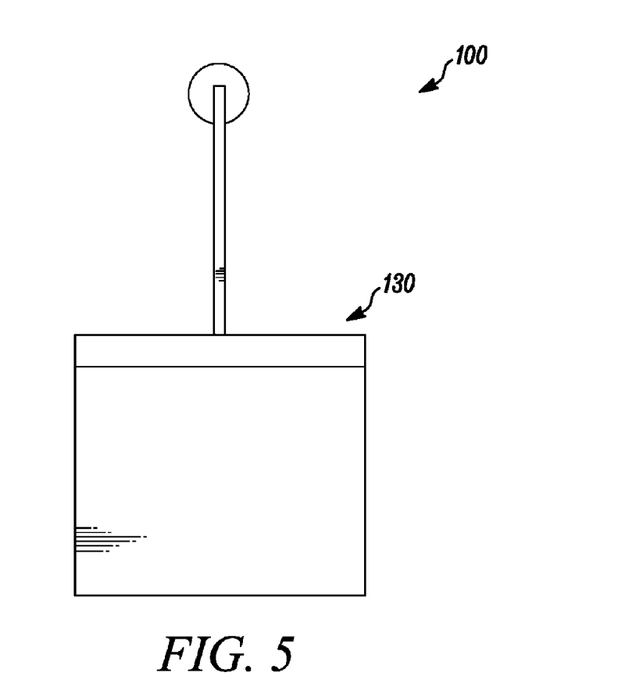
FIG. 5 is a left end view of a multifunction spacer tool according to one embodiment of the present invention.

FIG. 5 is an end view of the other end of tool 100.

Figure 6:
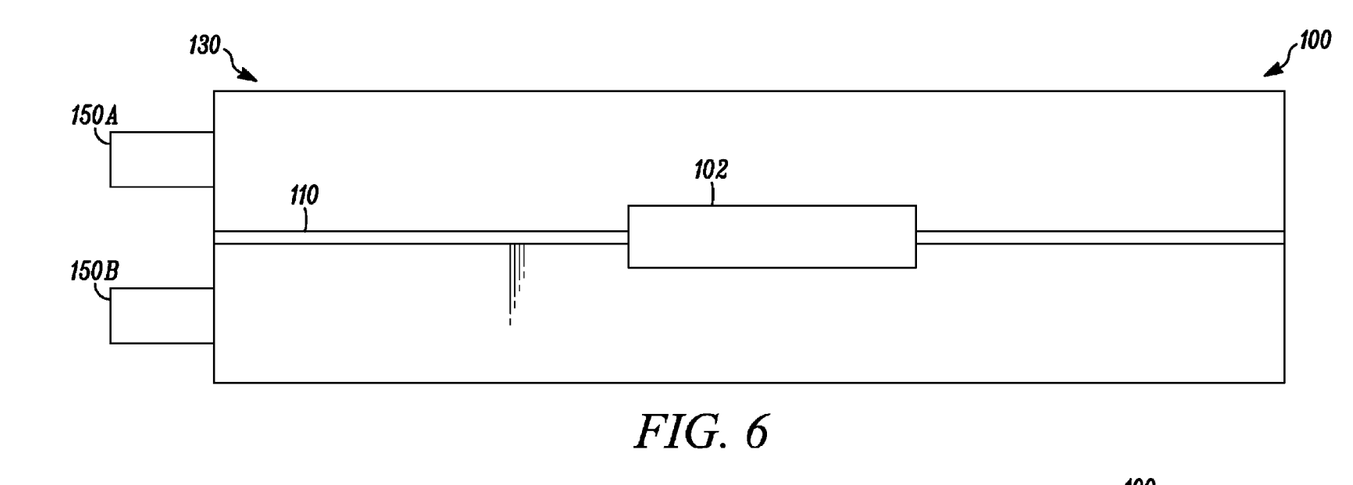
FIG. 6 is a top view of a multifunction spacer tool according to one embodiment of the present invention.

FIG. 6 is a top view of tool 100, looking down on the handle 102, the floorboard spacer 110, and the center deck 130. The baluster spacer fingers 150A and 150B are clearly shown in this top view. The baluster spacer fingers 150 made be made of any hard, durable material either the same as or different than that of the body of the tool 100. Additional detail of the operation of baluster spacer fingers 150 is discussed below with regard to FIGS. 8 and 9.

Figure 7:
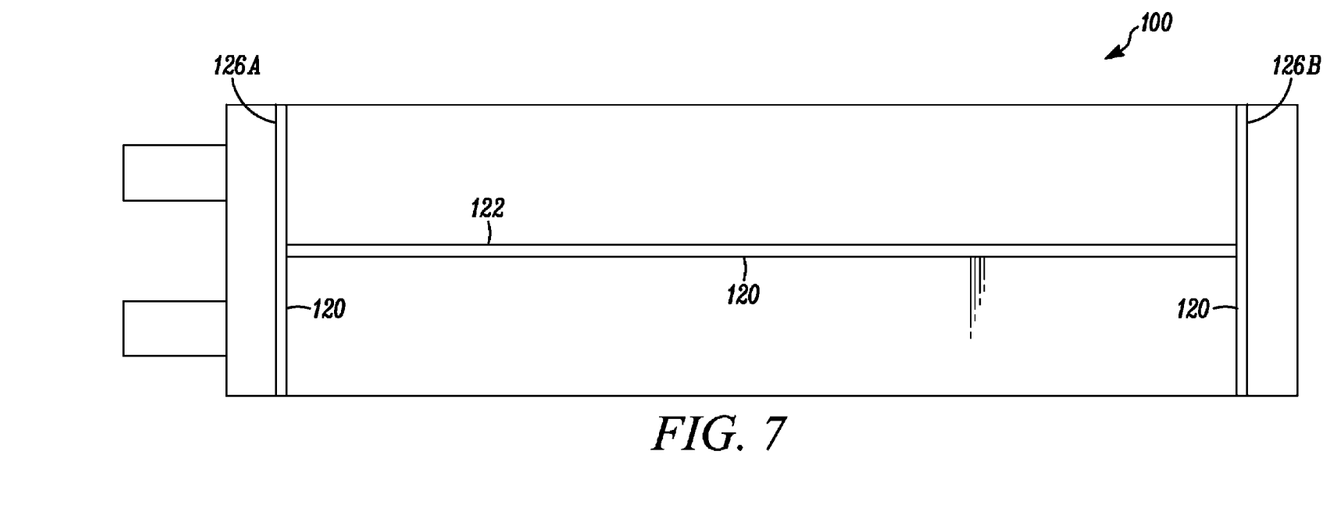
FIG. 7 is a bottom view of a multifunction spacer tool according to one embodiment of the present invention.

FIG. 7 is a bottom view of the tool 100, looking "up" at the stud spacer assembly 120 (i.e., at center chord 122 and end caps 126A and 126B).

Figure 8:
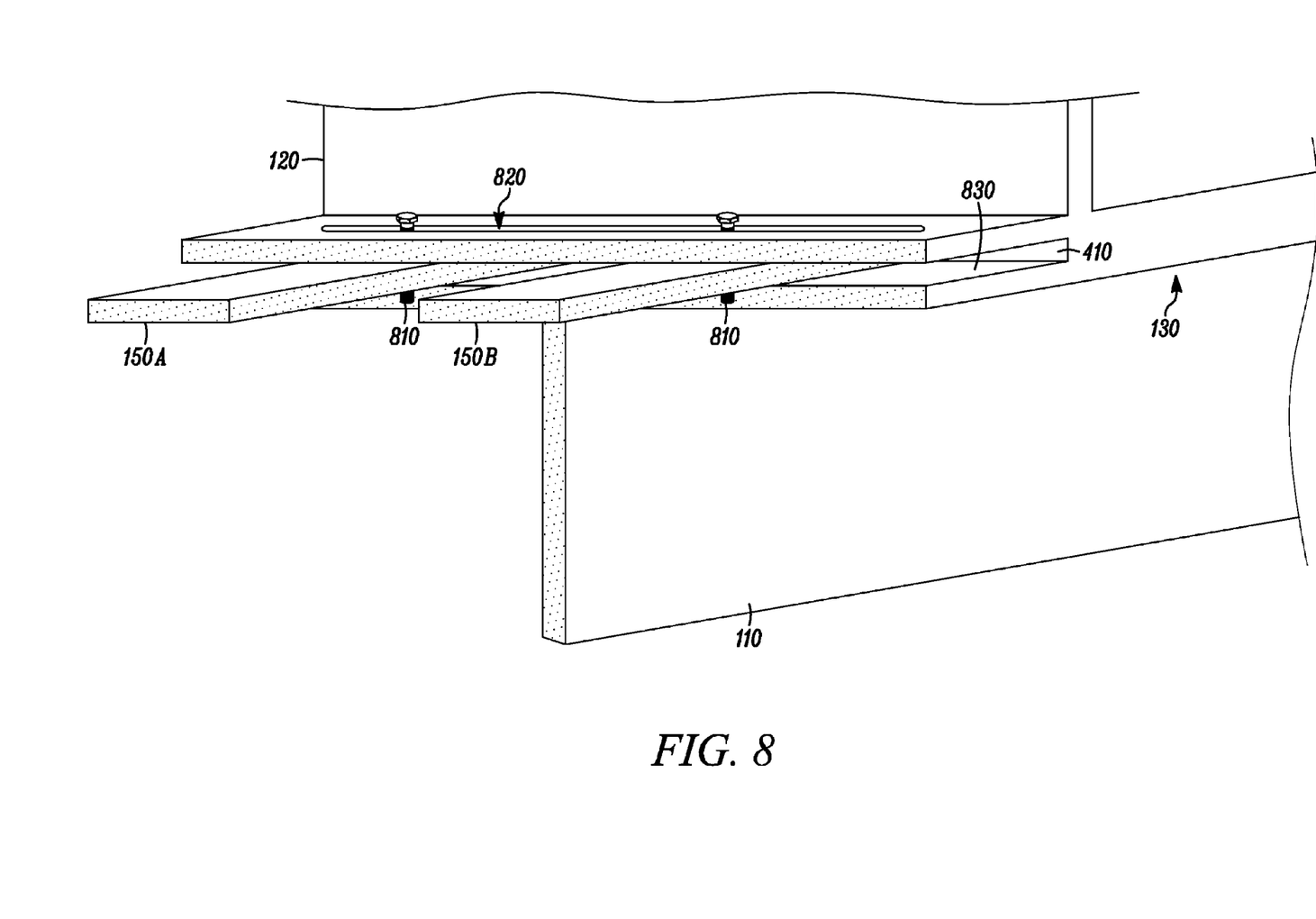
FIG. 8 is an isometric view the baluster spacer fingers according to one embodiment of the present invention.

FIG. 8 shows an exemplary embodiment of the method of attachment of the baluster spacers 150 to the center deck 130. In some embodiments, the baluster spacer fingers 150A and 150B are moveably located in the slot 410 in the center deck 130. The fingers 150A and 150B may be secured, in some embodiments, by means of set screws (or similar fasteners) 810 inserted through a set screw slot 820 to engage threaded holes (not shown) in the fingers 150. The set screws 810 may be long enough to protrude through the fingers 150 and to contact the surface 830 of the center deck 130 opposite the set screw slot 820 while simultaneously also protruding into the set screw slot 820. In this way, the set screws 810 prevent the fingers 150 from falling out of the center deck slot 410. Alternatively, the set screws 810 may be #8×⅛ inch Allen screws commonly used in the mechanical arts, although those skilled in the art will realize that many other set screws including non-Allen screws and screws of various sizes, lengths, threads, and so forth may be suitably adapted to use with the devices described herein. In some embodiments, at a desired length, the set screws 810 do not protrude into the set screw slot 820 when tightened into contact with the surface 830. Accordingly, the invention is not limited to any particular type of set screw.

In one exemplary embodiment, the baluster spacer fingers 150 are 2 inches long, ¾ inches wide, and ⅛ inch thick, although various sizes could be used in coordination with a corresponding depth and thickness of the center deck slot 410.

Figure 9A:
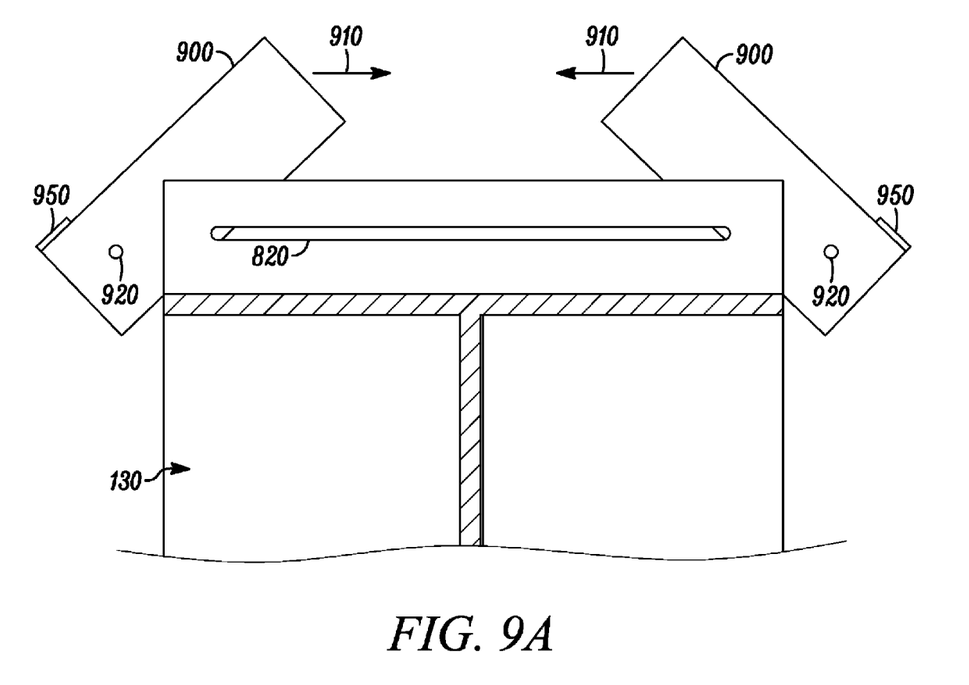
FIGS. 9A-9C illustrate an alternative embodiment of baluster spacer fingers adapted to be retracted for storage.
Figure 9B:
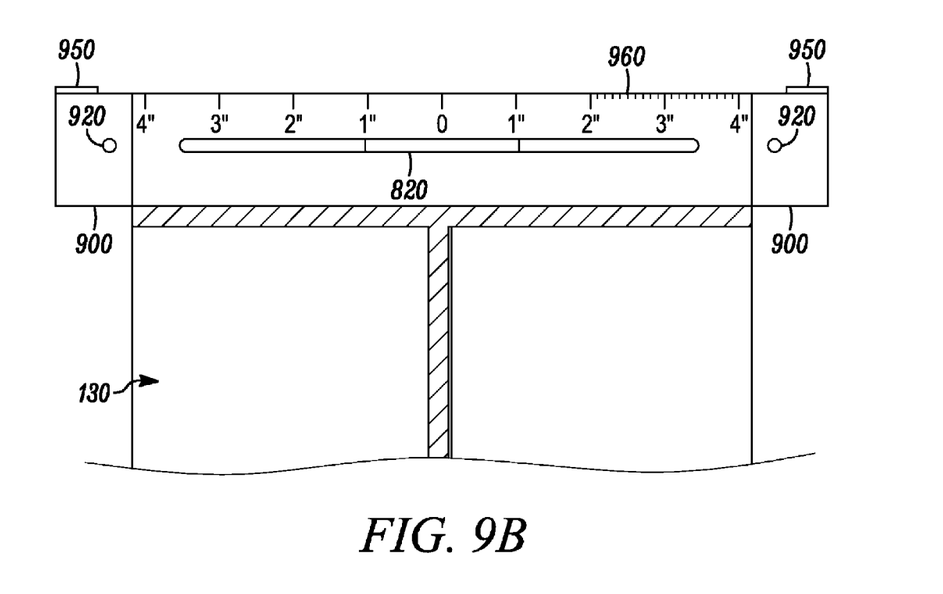
Figure 9C:
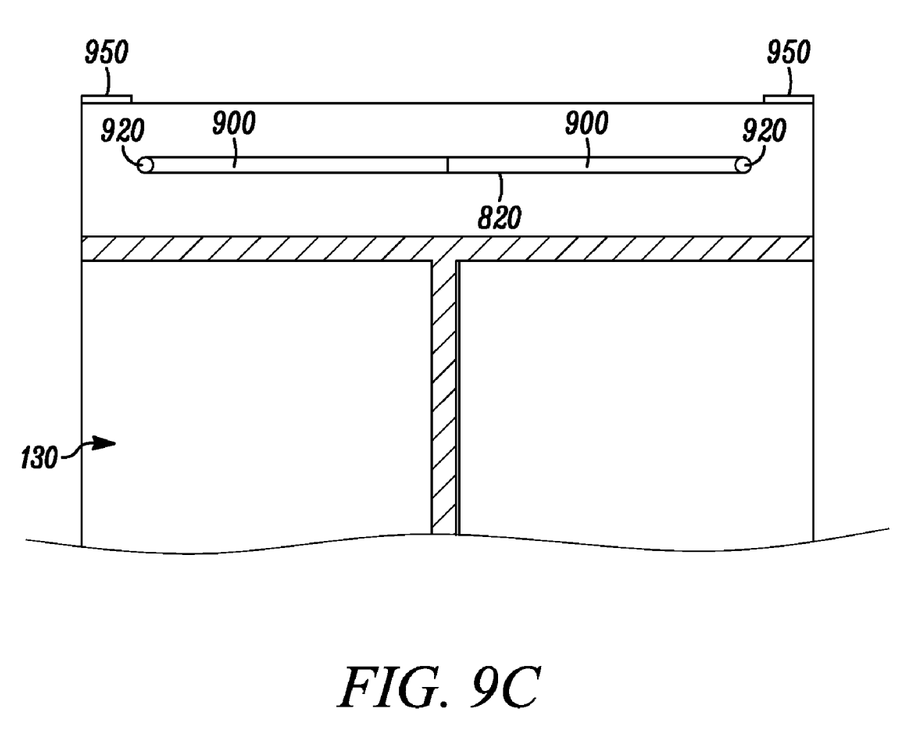

FIGS. 9A-9C illustrate an exemplary embodiment of baluster spacer fingers 900 adapted to be retractable for storage within center deck slot 410. From an extended position such as that shown in FIG. 8, fingers 900 may be rotated inward as shown by arrows 910 in FIG. 9A. Note that, in this illustration, the center deck slot 410 is shown on the stud spacer side of the tool 100. One of ordinary skill in the art will recognize that center deck slot 410 can be on either the stud-spacer side or the floorboard-spacer side of the tool without impacting the utility or function of the device. In this embodiment, the set screws 920, whose length is equal to or slightly less than the thickness of the fingers 900, are retracted into the fingers 900 so that the fingers 900 are able to slide out of the center deck slot 410.

FIG. 9B shows the fingers 900 rotated parallel to the long axis of the center deck slot 410, which is also parallel to the set screw slot 820. The set screws 920 are still retracted (screwed) into the fingers 900, which allows the fingers 900 to be fully inserted into the center deck slot 410, as shown in FIG. 9C. In this stowed position, set screws 920 are then screwed down, into, and partially through the fingers 900, to contact the surface 830 (referring to FIG. 8) of the center deck 130 to secure the fingers 900.

In a further alternate embodiment, the baluster spacer fingers 900 (or 150, as shown in FIGS. 1-8) may have formed on their outer edges thumb knurls or tabs 950. The thumb knurls 950 may serve as gripping points for sliding the fingers to or from their stowed position (FIG. 9C). The thumb knurls 950 may be formed as an integral part of the fingers or may be applied or fastened to them later.

In a still further embodiment, the projecting portion of the center deck 130 encompassing the center deck slot 410 may have marked on it upper and/or lower surfaces a measuring scale 960, such as that exemplified in FIG. 9B, for assistance in positioning the spacer fingers 900 equidistant from the centerline of the tool. Alternatively, any other measuring scale known to those in the art may be used, without limitation, to allow the craftsman to set the spacing distance between the fingers. The scale 960 may also be used in conjunction with detents machined or otherwise formed in the surface 830 of the center deck slot 410 so that the set screws 920 may be rapidly positioned at regular intervals, in one embodiment of 1/16th of an inch, across the width of the tool.

In embodiments where the set screws 920 are Allen screws, an Allen (hexagonal or "hex") wrench or "key" is needed to loosen and tighten them. This tool may, in some exemplary embodiments, be stowed in a hole drilled in the end of the handle 110 (referring to FIG. 1). Such holes, commonly used in the art, are of a diameter slightly smaller than the widest dimension of the hex wrench and secure the wrench with friction. In a further alternate embodiment, the handle 110 may be attached to the tool 100 by bolts or screws that are tightened using the same size Allen key. This eliminates the need to use a separate the tool to remove the handle 102 and replace it on the other side of the tool at a cutout 220 (referring back to FIG. 2) before using the floorboard spacer 110.

Other techniques for fixing two movable, slidable, rotatable, and/or removable fingers or other supports in a fixed-distance relationship are also known in the art, and may be suitably adapted to use in an adjustable baluster spacer as described herein.

Figure 10:
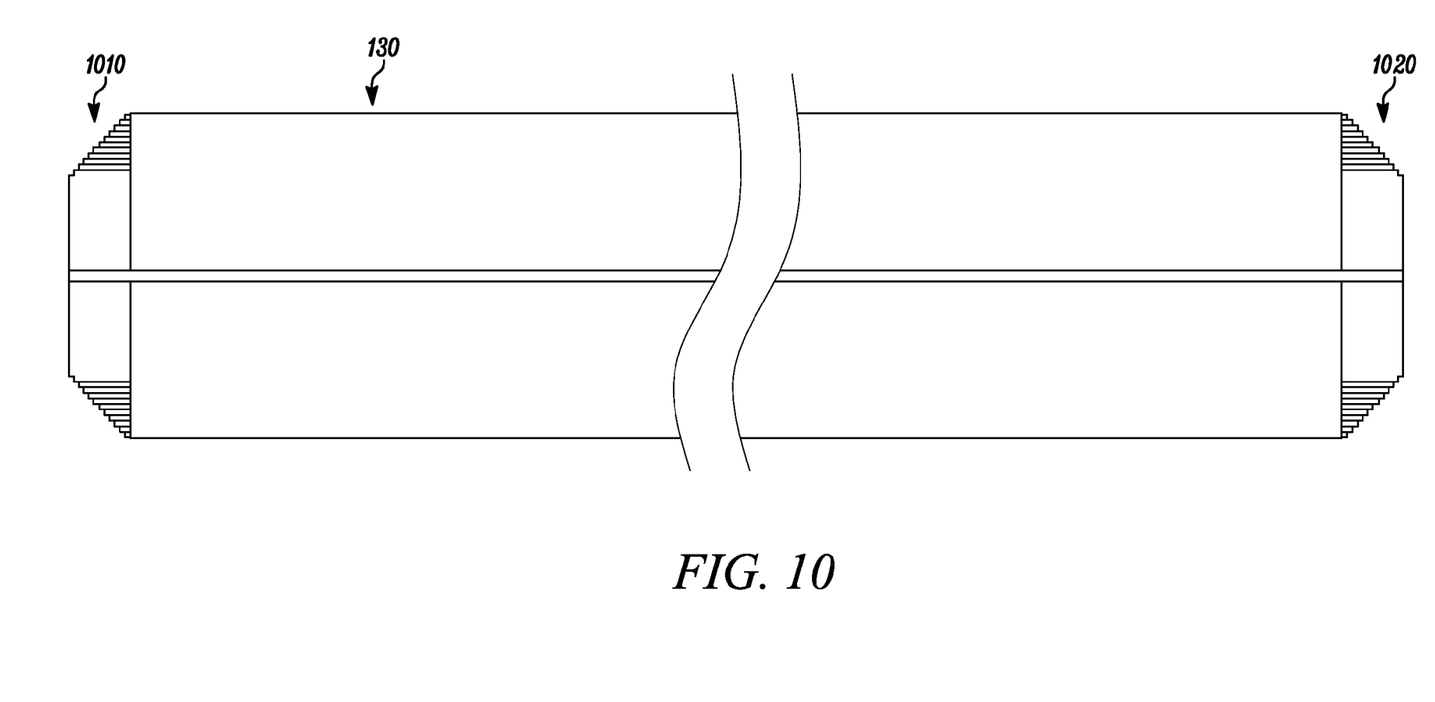
FIG. 10 illustrates alternate embodiment for the baluster spacer function of this multi-purpose tool.

FIG. 10 illustrates another alternate embodiment for the baluster spacer function of this multi-purpose tool. Here, the tool 1000 utilizes stair step tongues 1010 and 1020 to provide fixed spacing in increments of 1/16th of an inch. In one exemplary embodiment, the tongue 1010 provides spacings from 2-½ to 4 inches in 1/16th inch steps and the tongue 1020 provides spacings from 1 to 2-½ inches in 1/16th inch steps. One of ordinary skill in the art will appreciate that tongue widths, increment sizes and combinations thereof may be varied to provide other amounts and varieties of spacing intervals without departing from the spirit of this invention. Also, the invention may be practiced with only one tongue or two tongues of the same configuration. Accordingly, the scope of the present invention is not to be limited by the step size or spacing intervals of the tongues. Other tongue shapes and step sizes may also usefully be employed.

The multifunction spacer may be made of any material now known or discovered in the future, for example (but not by way of limitation, wood, metal, plastic, composite materials, or any combination thereof. Accordingly, fabrication of the present invention is not limited to any particular material, unless specifically stated otherwise in the present disclosure. In certain embodiments, the entire tool 100 may be formed of a single, integral piece of material that may be cast or otherwise molded. In other embodiments, the main body of the tool 100 may be integrally formed except for the adjustable baluster spacers.

While particular embodiments of the present invention have been shown and described, it will be apparent to those skilled in the art that various changes and modifications in form and details may be made therein without departing from the spirit and scope of the invention as defined by the following claims, which are to be interpreted in the broadest sense allowable by law.

What is claimed is:

1. A device comprising:
a center deck, the center deck being substantially planar;
a first pair of spacing surfaces, the first pair of spacing surfaces being substantially planar and substantially parallel surfaces that extend from a bottom side of the center deck at a right angle thereto, and that extend along a majority of a width of the center deck, and the first pair of spacing surfaces separated by a first distance along a length of the center deck that is fixed and selected to space studs;
a second pair of spacing surfaces formed by opposing sides of a single, planar part that extend upward at a right angle from a center line of the center deck, the second pair of spacing surfaces extending along a majority of the length of the center deck and separated by a second distance along the width of the center deck that is fixed and selected to space floorboards; and
an adjustable spacer extending from the center deck that provides a range of user-selectable spacings from additional spacing surfaces.

2. The device of claim 1 wherein the single, planar part includes a cutout shaped and sized for gripping by a hand.

3. The device of claim 2 further comprising a removable handle including a cushioned gripping surface.

4. The device of claim 1 wherein the adjustable spacer further includes a plurality of fingers extending from the center deck.

5. The device of claim 4 wherein the center deck includes an opening shaped and sized to receive each one of the plurality of fingers in a deployed position wherein the fingers present a third opposing pair of surfaces for spacing balusters, and further shaped and sized to receive each one of the plurality of fingers in a stowed position wherein the fingers are entirely enclosed within a perimeter of the center deck.

6. The device of claim 5 wherein the plurality of fingers include thumb knurls to assist a user in moving the plurality of fingers between the deployed position and the stowed position.

7. The device of claim 4 wherein the center deck includes detents to securely locate the plurality of fingers at a desired spacing.

8. The device of claim 1 wherein the adjustable spacer includes one or more baluster spacer stair step tongues formed in an end of the center deck.

9. The device of claim 1 wherein the adjustable spacer is adjustable over a range of at least three quarters of an inch to four inches.

10. The device of claim 1 wherein the adjustable spacer is adjustable in increments of at least one sixteenth of an inch.

11. The device of claim 1 wherein at least one of the first distance and the second distance is selected according to a construction industry standard that is based on English units of measurement.

12. The device of claim 1 wherein at least one of the first distance and the second distance is selected according to a construction industry standard that is based on metric units of measurement.

13. The device of claim 1 wherein the first distance is fourteen and one-half inches.

14. The device of claim 1 wherein the second distance is one eighth of an inch.

15. The device of claim 1 wherein the first pair of surfaces are interconnected by a planar structural member having a bottom edge flush with a bottom edge of each one of the first pair of surfaces.

16. The device of claim 15 wherein the planar structural member includes an opening shaped and sized for gripping.

17. A device comprising:
a first pair of spacing surfaces, the first pair of spacing surfaces being substantially planar and substantially parallel surfaces separated by a first distance that is fixed and selected to space studs;
a second pair of spacing surfaces formed by opposing sides of a single, planar part oriented at a right angle to the first pair of spacing surfaces along at least one axis and extending along a majority of the entire first distance, the second pair of spacing surfaces separated by a second distance that is fixed and selected to space floorboards; and
an adjustable spacer extending from a center deck attached to the first pair of spacing surfaces that provides a range of user-selectable spacings from additional spacing surfaces.

* * * * *